US012772190B2

(12) United States Patent
Farbman et al.

(10) Patent No.: US 12,772,190 B2
(45) Date of Patent: Oct. 20, 2026

(54) FREQUENCY SYNCHRONIZATION IN DECENTRALIZED COMMUNICATION NETWORKS

(71) Applicant: RAFAEL ADVANCED DEFENSE SYSTEMS LTD., Haifa (IL)

(72) Inventors: Barak Farbman, Ramat Yishai (IL); Ilya Desyatnikov, Netanya (IL); Eliran Peretz, Kiryat Motzkin (IL); Yehuda Halevy, Kiryat Ata (IL); Ariel Shwartzburg, Haifa (IL); Eran Ashrovich, Shechania (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 258 days.

(21) Appl. No.: 18/725,892

(22) PCT Filed: Nov. 15, 2022

(86) PCT No.: PCT/IB2022/060957
§ 371 (c)(1),
(2) Date: Jul. 1, 2024

(87) PCT Pub. No.: WO2023/144606
PCT Pub. Date: Aug. 3, 2023

(65) Prior Publication Data

US 2025/0088992 A1 Mar. 13, 2025

(30) Foreign Application Priority Data

Jan. 26, 2022 (IL) ........................................ 290209

(51) Int. Cl.
*H04W 56/00* (2009.01)

(52) U.S. Cl.
CPC ..... *H04W 56/0065* (2013.01); *H04W 56/001* (2013.01)

(58) Field of Classification Search
None
See application file for complete search history.

(56) References Cited

U.S. PATENT DOCUMENTS

2012/0063447 A1* 3/2012 Tyrrell .................. H04W 56/00 370/350
2014/0185592 A1* 7/2014 Kim .................. H04W 56/0015 370/336

* cited by examiner

*Primary Examiner* — Anh Ngoc M Nguyen
(74) *Attorney, Agent, or Firm* — Rivka Friedman

(57) ABSTRACT

Frequency synchronization methods provide synchronization among nodes of a decentralized communication network. At each of one or more nodes of a plurality of nodes that form a decentralized communication network, information is acquired that is indicative of a frequency associated with at least one other node of the plurality of nodes. For each of the one or more nodes, a frequency offset between a frequency of the node and a frequency of the at least one other node is determined, based in part on the acquired information.

20 Claims, 5 Drawing Sheets

| Origin Node | Frequency Offset | Weight |
|---|---|---|
| 12a | $\delta f_{12e,12a}$ | 15 |
| 12f | $\delta f_{12e,12f}$ | 1 |
| 12g | $\delta f_{12e,12g}$ | 1 |

FIG. 4

FREQUENCY SYNCHRONIZATION IN DECENTRALIZED COMMUNICATION NETWORKS

TECHNICAL FIELD

The present invention relates to communications networks, and more particularly, to frequency synchronization in communication networks.

BACKGROUND OF THE INVENTION

Communication systems rely on accurate time synchronization between transmit/receive elements in order to ensure robust communication and collision avoidance. Techniques for time synchronization in communication systems and networks are well-known, and may typically rely on Global Navigation Satellite System (GNSS) and/or various timing synchronization protocols to ensure time synchronization between communicating elements of a communication system or network.

Frequency synchronization between communicating transmit/receive elements of a communication system or network is also critical. Each transmit/receive element has a local oscillator which dictates the local frequency of the element. Techniques for performing frequency synchronization in simple point-to-point communication systems are well-known, and may typically rely on feedback loops, such as phase-locked loops, at the physical layer to enable receive elements to synchronize in frequency to transmit elements on a per message basis. Such techniques can correct for jitter, which is the zero-mean temporal change in the frequency output by the local oscillator of each transmit/receive element that dictates the local frequency of the element. In communication networks having multiple communication nodes, an additional ambiguity pertaining to the target frequency correction for each node may arise which cannot be effectively corrected at the physical layer. In communication networks that have some pre-existing network infrastructure, for example in the form of access points (e.g., in wireless local area networks) and/or base stations (e.g., in cellular networks), the infrastructure components can provide frequency information to the various network nodes to overcome such ambiguity so as to enable accurate frequency synchronization across the network.

SUMMARY OF THE INVENTION

The present invention is a decentralized communication network and methods for providing frequency synchronization in a decentralized communication network.

According to the teachings of an embodiment of the present invention, there is provided a method for frequency synchronization. The method comprises: at each of one or more nodes of a plurality of nodes that form a decentralized communication network, acquiring information indicative of a frequency associated with at least one other node of the plurality of nodes; and determining, for each of the one or more nodes, a frequency offset between a frequency of the node and a frequency of the at least one other node based at least in part on the acquired information.

Optionally, for each of the one or more nodes the acquiring includes: receiving and decoding at least one signal transmission from a neighboring node, the at least one signal transmission associated with metadata that includes frequency compensation information between a local frequency of the node and a local frequency of the neighboring node.

Optionally, the at least one signal transmission includes metadata indicative of frequency compensation information between a local frequency of the neighboring node and a local frequency of another node that neighbors the neighboring node.

Optionally, for each of the one or more nodes the acquiring includes: setting a measurement time frame that follows a reference clock of a time source that provides timing synchronization for the decentralized communication network, and sampling a raw counter of a clock of the node at the beginning of the measurement time frame and at the end of the measurement time frame to obtain a number of clock ticks for the measurement time frame.

Optionally, for each of the one or more nodes the determining the frequency offset includes: comparing the number of clock ticks to an expected number of clock ticks to determine a clock tick correction factor relative to the reference clock, and calculating the frequency offset based on a local oscillator frequency of the node and the determined clock tick correction factor.

Optionally, for each of the one or more nodes the acquiring includes: setting a measurement time frame that follows a reference clock of a time source that provides timing synchronization for the decentralized communication network, and calculating an accumulated amount of time corrections made relative to the reference clock during the measurement time frame.

Optionally, for each of the one or more nodes the determining the frequency offset includes: calculating the frequency offset based on a local oscillator frequency of the node and the accumulated amount of time corrections.

Optionally, the reference clock is deployed in one of the nodes of the decentralized communication network.

Optionally, the method further comprises: for each of the one or more nodes, distributing the determined frequency offset to the other nodes of the decentralized communication network.

Optionally, the method further comprises: for each of the one or more nodes, based on the determined frequency offset applying a frequency correction to the frequency of the node or to the frequency of the at least one other node.

Optionally, the at least one other node is the same for each of the one or more nodes and is a node that acts as a time source for the nodes of the decentralized communication network that provides timing synchronization for the decentralized communication network.

Optionally, the node that acts as the time source is a virtual node.

Optionally, the node that acts as the time source is a physical node of the decentralized communication network.

Optionally, the node that acts as the time source is in networked communication with a second communication network that provides timing information.

Optionally, the decentralized communication network is a wireless network.

Optionally, the wireless network is a mobile ad hoc network or a wireless ad hoc network.

There is also provided according to the teachings of an embodiment of the present invention, a decentralized communication network. The decentralized communication network comprises: a plurality of nodes, in which for each node of one or more nodes of the plurality of nodes, the node is configured to: acquire information indicative of a frequency associated with at least one other node of the plurality of nodes, and determine a frequency offset between a frequency of the node and a frequency of the at least one other node based at least in part on the acquired information.

Optionally, for each node of the one or more nodes, the node is configured to acquire information indicative of a frequency associated with at least one other node of the plurality of nodes by: receiving and decoding at least one signal transmission from a neighboring node, the at least one signal transmission associated with metadata that includes frequency compensation information between a local frequency of the node and a local frequency of the neighboring node Optionally, the at least one signal transmission includes metadata indicative of frequency compensation information between a local frequency of the neighboring node and a local frequency of another node that neighbors the neighboring node.

Optionally, for each node of the one or more nodes, the node is configured to acquire information indicative of a frequency of at least one other node of the plurality of nodes by: setting a measurement time frame that follows a reference clock of a time source that provides timing synchronization for the decentralized communication network, and sampling a raw counter of a clock of the node at the beginning of the measurement time frame and at the end of the measurement time frame to obtain a number of clock ticks for the measurement time frame.

Optionally, for each node of the one or more nodes, the node is configured to determine the frequency offset by: comparing the number of clock ticks to an expected number of clock ticks to determine a clock tick correction factor relative to the reference clock, and calculating the frequency offset based on a local oscillator frequency of the node and the determined clock tick correction factor.

Optionally, for each node of the one or more nodes, the node is configured to acquire information indicative of a frequency of at least one other node of the plurality of nodes by: setting a measurement time frame that follows a reference clock of a time source that provides timing synchronization for the decentralized communication network, and calculating an accumulated amount of time corrections made relative to the reference clock during the measurement time frame.

Optionally, for each node of the one or more nodes, the node is configured to determine the frequency offset by: calculating the frequency offset based on a local oscillator frequency of the node and the accumulated amount of time corrections.

Optionally, the reference clock is deployed in one of the nodes of the decentralized communication network.

Optionally, for each node of the one or more nodes, the node is further configured to: distribute the determined frequency offset to the other nodes of the decentralized communication network.

Optionally, for each node of the one or more nodes, the node is further configured to: based on the determined frequency offset, apply a frequency correction to the frequency of the node or to the frequency of the at least one other node.

Optionally, the at least one other node is the same for each of the one or more nodes and is a node that acts as a time source for the nodes of the decentralized communication network that provides timing synchronization for the decentralized communication network.

Optionally, the node that acts as the time source is a virtual node.

Optionally, the node that acts as the time source is a physical node of the decentralized communication network.

Optionally, the node that acts as the time source is in networked communication with a second communication network that provides timing information.

Optionally, the decentralized communication network is a wireless network.

Optionally, the wireless network is a mobile ad hoc network or a wireless ad hoc network.

There is also provided according to the teachings of an embodiment of the present invention, a device deployed at a node that is one of a plurality of nodes that form a decentralized communication network. The device comprises: an acquisition module configured to acquire information indicative of a frequency associated with at least one other node of the plurality of nodes of the decentralized communication network; and a frequency offset module configured to determine a frequency offset between a frequency of the node and a frequency of the at least one other node based at least in part on the acquired information.

Optionally, the acquisition module includes a transceiver configured to receive and decode at least one signal transmission from a neighboring node of the decentralized communication network, the at least one signal transmission associated with metadata that includes frequency compensation information between a local frequency of the node and a local frequency of the neighboring node.

Optionally, the at least one signal transmission includes metadata indicative of frequency compensation information between a local frequency of the neighboring node and a local frequency of another node that neighbors the neighboring node.

Optionally, the device further comprises a clock, and the acquisition module includes a timing module configured to: set a measurement time frame that follows a reference clock of a time source that provides timing synchronization for the decentralized communication network, and sample a raw counter of a clock of the node at the beginning of the measurement time frame and at the end of the measurement time frame to obtain a number of clock ticks for the measurement time frame.

Optionally, the device further comprises a local oscillator associated with the clock, and the frequency offset module is configured to determine the frequency offset by: comparing the number of clock ticks to an expected number of clock ticks to determine a clock tick correction factor relative to the reference clock, and calculating the frequency offset based on a local oscillator frequency of the node and the determined clock tick correction factor.

Optionally, the acquisition module includes a timing module configured to: a measurement time frame that follows a reference clock of a time source that provides timing synchronization for the decentralized communication network, and calculate an accumulated amount of time corrections made relative to the reference clock during the measurement time frame.

Optionally, the device further comprises a local oscillator, and the frequency offset module is configured to determine the frequency offset by: calculating the frequency offset based on a local oscillator frequency of the node and the accumulated amount of time corrections.

There is also provided according to the teachings of an embodiment of the present invention, a decentralized communication network. The decentralized communication network comprises a plurality of nodes, each node including a device that includes: an acquisition module configured to acquire information indicative of a frequency associated with at least one other node of the plurality of nodes of the decentralized communication network; and a frequency offset module configured to determine a frequency offset between a frequency of the node and a frequency of the at least one other node based at least in part on the acquired information.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 4 is an example of a table, that maintains frequency offset information, that can be stored and updated by nodes of the decentralized communication network of FIGS. 1 and 3.

DESCRIPTION OF THE PREFERRED EMBODIMENTS

Figure 1:
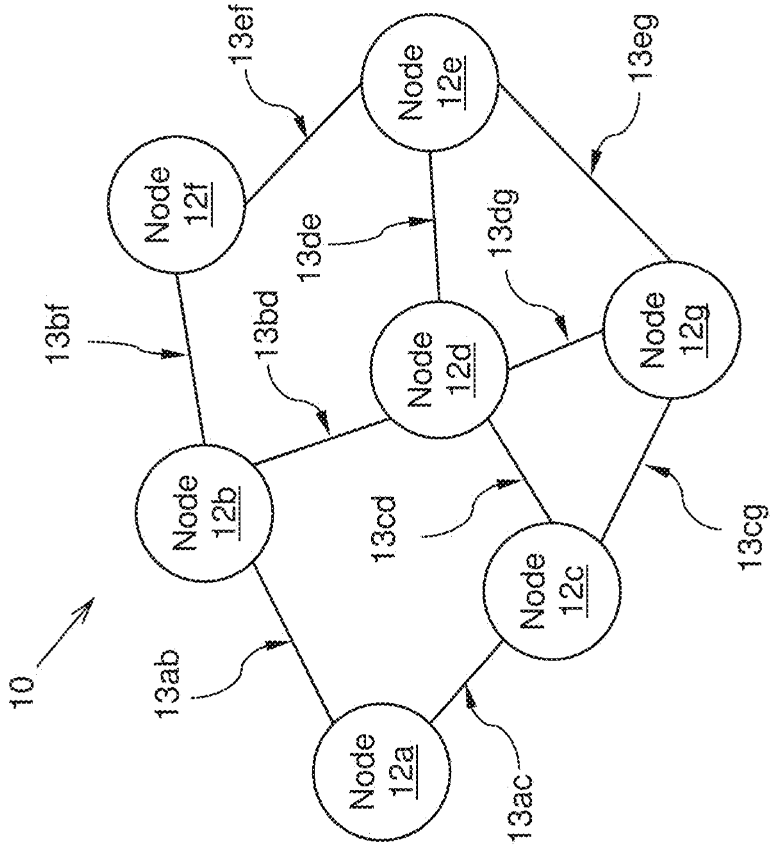
FIG. 1 is a schematic representation of a decentralized communication network having a plurality of nodes according to certain embodiments of the present disclosure.

The present invention is a communication system in the form of a decentralized communication network and methods for providing frequency synchronization in a decentralized communication network.

The principles and operation of the methods and system according to present invention may be better understood with reference to the drawings accompanying the description.

Embodiments of the present disclosure are applicable to various types of decentralized communication networks, including wireless and wired network, and are of particular value when applied to ad hoc networks, particularly mobile ad hoc networks and wireless ad hoc networks.

The synchronization methods according to the embodiments disclosed herein are particularly advantageous in that frequency synchronization among the nodes of the network can be achieved without overloading the network with specifically designated frequency synchronization transmissions and synch packets. Rather, the methods of the present disclosure are passive, and rely on frequency synchronization information that is either intrinsically present as an outcome of successful communication exchanges between pairs of neighboring nodes, or is gleaned from clock/timing circuitry of the nodes. Since the methods according to the embodiments of the present disclosure are generally passive, the bandwidth of the communication network is of relatively low importance, and therefore the methods according to the present disclosure can be used to advantage in both narrowband and wideband networks. Furthermore, the methods of the present disclosure enable frequency synchronization between network nodes that are separated by any number of network hops (with theoretically no upper bound on the number of network hops separating a pair of nodes), where, as will be discussed, in the context of the present disclosure a pair of neighboring nodes (i.e., nodes that can directly communicate with each other without an intervening node) are separated by one network hop. As a result, the frequency synchronization algorithms according to the embodiments of the present disclosure provide improved frequency synchronization convergence times and accuracy, thereby enabling faster frequency synchronization in situations in which new nodes join the network and/or in cases of merging groups across the network.

In addition, the frequency synchronization algorithms according to the embodiments of the present disclosure are particularly suitable for use in mobile ad hoc networks (MANETs) that have multi-channel reception capability, such as the MANET described in commonly owned U.S. Pat. No. 9,438,386. To this end, the frequency synchronization algorithms according to the embodiments of the present disclosure preferably also employ multi-channel reception algorithms, such as those described in U.S. Pat. No. 9,438,386.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Referring now to the drawings, FIG. 1 illustrates a decentralized communication network (referred to hereinafter in the present description interchangeably as "communication network" or "network"), generally designated 10, according to certain embodiments of the present disclosure. Generally speaking, the network 10 is formed from a plurality of nodes, designated 12*a*-12*g*. Each of the nodes is in direct or indirect signal communication with every other node of the network 10 via one or more communication links, designated 13*ab*, 13*ac*, 13*bd*, 13*bf*, 13*cd*, 13*cg*, 13*de*, 13*dg*, 13*ef*, and 13*eg*. Although seven nodes are illustrated in FIG. 1 for simplicity of presentation, embodiments of the present disclosure can be implemented with a plurality of nodes containing anywhere between three and a few hundred nodes.

Parenthetically, the letters used as part of a communication link identifier are indicative of the two nodes that are in direct signal communication with each other over that communication link. Thus, for example, communication link 13_ab_ is the communication link through which nodes 12_a_ and 12_b_ are in direct signal communication with each other. Preferably, each of the communication links is a bidirectional link that supports signal transmission from the first node connected to a communication link to the second node connected to the communication link, and vice versa. Thus, for example, communication link 13_ab_ preferably supports direct signal transmission from node 12_a_ to node 12_b_ and direct signal transmission from node 12_b_ to node 12_a_.

Within the context of the present disclosure, a pair of nodes that are in direct communication with each other (i.e., without an intervening node) are referred to interchangeably as "neighboring nodes" or "neighbor nodes". Thus, for example, the pair of nodes 12_a_, 12_b_ are neighboring or neighbor nodes, as are, for example, the pair of nodes 12_b_, 12_f_. According to this definition of neighboring nodes, the pair of nodes 12_a_, 12_f_ are not neighboring nodes, since the nodes 12_a_, 12_f_ are in indirect communication with each other.

Within the context of the present disclosure, a "network hop" refers to the number of communication links (e.g., 13_ab_, 13_bf_, etc.), and preferably the smallest number of such links, that are traversed in order for a pair of nodes to communicate with each other. Accordingly, within the context of the present disclosure a pair of neighboring nodes are separated by one network hop, whereas a pair of non-neighboring nodes are necessarily separated by more than one network hop. Thus, for example, the nodes 12_a_, 12_b_ are separated by one network hop, whereas the nodes 12_a_, 12_f_ are separated by two network hops. It is noted that although a pair of nodes may be ideally separated by a certain number of network hops along a particular communication route, other routes may be available through the network which may require more network hops. For example, although in an ideal situation the node 12_a_ may communicate directly with node 12_b_ (via one network hop), the node 12_a_ may also communicate with the node 12_b_ indirectly for example via the path of nodes 12_a_-12_c_-12_d_-12_b_ (i.e., three network hops).

The network 10 is a decentralized communication network, meaning that the network 10 lacks pre-existing network infrastructure components, for example in the form of master access point nodes or controller base stations which can provide frequency synchronization information to the other nodes of the network. Each of the network nodes 12_a_-12_g_ participates in routing by forwarding data for other nodes, and the determination of which nodes forward data at a given time can be made dynamically on the basis of network connectivity and the type of routing methodology used by the network 10. In contrast to the decentralized communication network 10, in conventional centralized communication networks (master or controller-based communication networks), such as cellular networks, wide area networks (WANs), local area networks (LANs), and the like, the master access point nodes or controller base stations can provide frequency synchronization information to all of the network nodes allowing all of the network nodes to tune to a frequency dictated by the local oscillator of the master/controller to enable communication between nodes.

Embodiments of the present disclosure include frequency synchronization methods which enable synchronizing frequency among the nodes 12_a_-12_g_ of the decentralized communication network 10, despite the lack of pre-existing network infrastructure components. The frequency synchronization methods according to the embodiments disclosed herein can be used to advantage with any type of decentralized communication network, including wired and wireless networks, which can also include mesh networks and/or packet-switched networks, and are of particular value when the network 10 is an ad hoc wireless network, including a mobile ad hoc network (MANET) or a wireless ad hoc network (WANET).

The synchronization methods according to the embodiments of the present disclosure generally overcome frequency errors implicitly present in the local oscillator of each of the nodes 12_a_-12_g_ in the form of frequency biases, where each local oscillator has a frequency bias that is formed as an accumulation over time of the constant and directional frequency shifts that are typically aggregated during power-up of the local oscillator or the node. The portion of the frequency bias aggregated during power-up of the local oscillator is referred to as "retrace", and the accumulation of this aggregation over time (i.e., the change in "retrace" over time) is referred to as "aging". In addition to frequency bias, local oscillators also typically have an initial frequency offset (initial bias) and an associated frequency jitter, which is the temporal changes in frequency of the local oscillator. The initial bias can be compensated/corrected during factory calibration. In addition, local oscillators can typically be periodically re-calibrated after factory calibration, and the "aging" component of frequency bias (which changes slowly over time) is measured between such post-factory calibrations. The frequency jitter (associated with the nodes 12_a_-12_g_) can typically be compensated or corrected on a per-message basis (i.e., per exchange of communication between any two of the nodes 12_a_-12_g_) using anti-jitter techniques that are known in the art, briefly discussed in the background section of the present document. One set of anti-jitter techniques are implemented at the physical layer using various anti-jitter electronic circuits, including, for example, delay-locked loops and phase-locked loops.

Bearing the above in mind, in order to synchronize frequency among the nodes 12_a_-12_g_ of the network 10, each of one or more of the nodes 12_a_-12_g_ (and in certain cases each of all of the nodes 12_a_-12_g_) acquires information that is indicative of a frequency associated with at least one other of the nodes 12_a_-12_g_. The frequency associated with the at least one other of the nodes 12_a_-12_g_ is typically the local frequency (dictated by a local oscillator) of that node which is used for transmission and/or reception, but in certain cases may also include a frequency compensation, i.e., frequency shift, applied by that node to its local frequency. Based on this acquired frequency information, each of the one or more nodes determines a frequency offset (shift) between the frequency of the node and the frequency of the at least one other node. For each of the one or more nodes, a frequency correction can then be applied to the frequency of the node (or to the frequency of the other node), based on the determined frequency offset. In certain embodiments, each node can distribute (disseminate) the determined frequency offset information to some or all of the other nodes of the network 10, which can be useful in determining the frequency correction to be applied at each node.

Various approaches for acquisition of frequency information, determination of frequency offset, frequency information distribution, and application of frequency correction are contemplated according to the embodiments of the present disclosure. For ease of presentation, the steps for acquisition of frequency information and determination of frequency offset are described herein as being sub-steps of a step of performing frequency shift measurement, whereby each node measures its own frequency shift relative to one or more other nodes of the network 10 by acquiring the frequency information and determination the frequency offset (shift).

Figure 2:
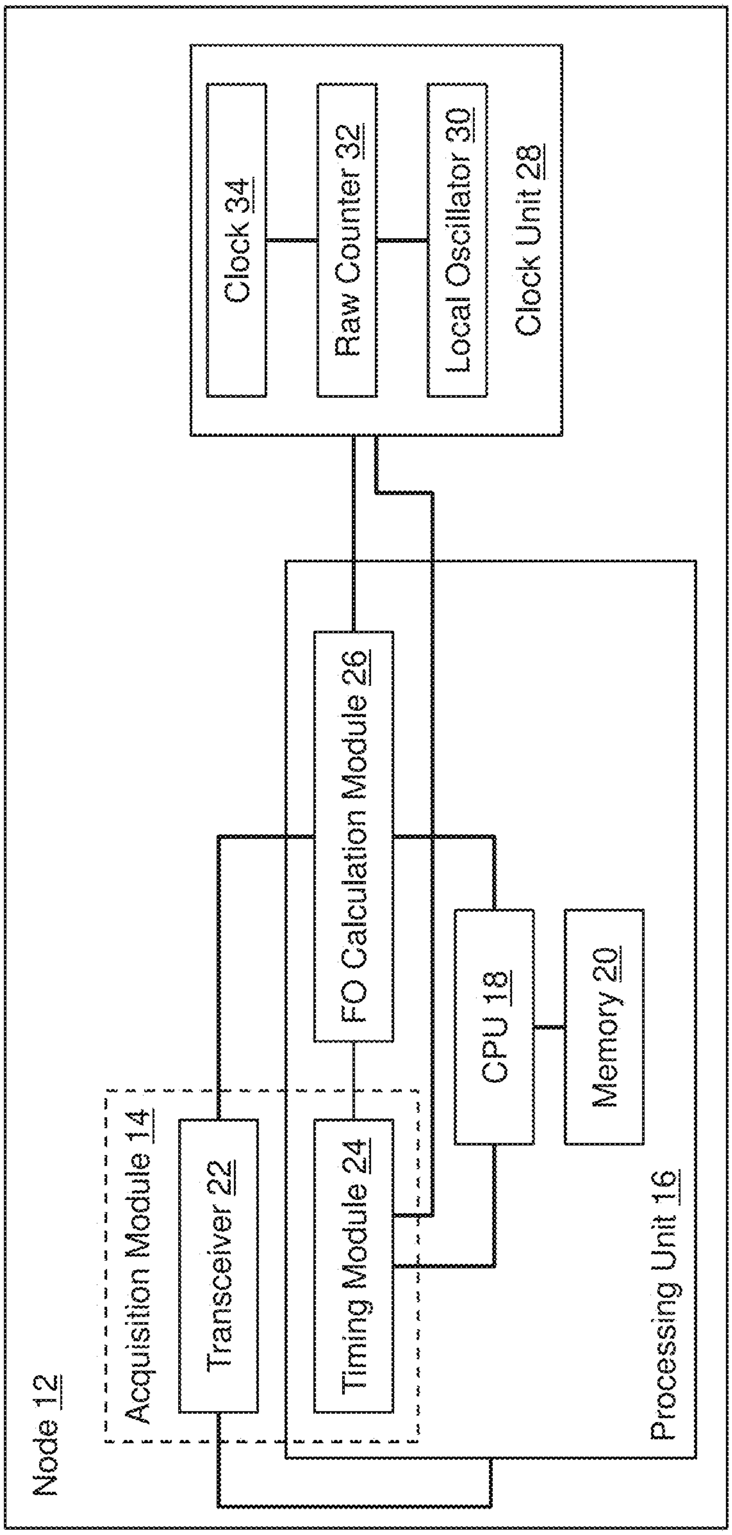
FIG. 2 is an exemplary block diagram of an exemplary node of the decentralized communication network of FIG. 1.

Before describing the various ways in which the acquisition, determination, and correction can be performed according to the embodiments of the present disclosure, attention is first directed to FIG. 2, which illustrates a schematic block diagram of an exemplary node 12 that without loss of generality is a representation of each of the nodes 12*a*-12*g* of FIG. 1. In other words, without loss of generality, each of the nodes 12*a*-12*g* can be considered as having components represented in the exemplary block diagram of FIG. 2.

With reference to FIG. 2, the node 12 generally includes a processing unit 16, a transceiver 22, and a clock unit 28. The processing unit 16 includes a central processing unit (CPU) 18 coupled to a memory 20, and a frequency offset (FO) calculation module 26 (also referred to interchangeably herein as FO module 26). In certain embodiments the processing unit 16 also includes a timing module 24. The timing module 24 and the transceiver 22 are grouped as part of an acquisition module 14, which functions to acquire the aforementioned frequency information. Some of the actions associated with performing frequency shift measurement, such as acquiring frequency information, are performed by the acquisition module 14 and associated components, and some of the actions associated with performing frequency shift measurement, such as calculating frequency offset based on the acquired frequency information, are performed by the FO module 26. As will be discussed, in certain embodiments the acquisition module 14 acquires frequency information primarily using the transceiver 22, while in other embodiments the acquisition module 14 acquires frequency information primarily using the timing module 24. In yet other embodiments, the transceiver 22 and the timing module 24 may work in tandem to perform tasks associated with the frequency synchronization methods according to embodiments of the present disclosure.

Although the CPU 18 and the memory 20 are shown as single components for representative purposes, either or both of the CPU 18 and the memory 20 may be multiple components.

The CPU 18 is formed of one or more computer processors, including microprocessors, which can be, for example, conventional processors, such as those used in servers, computers, and other computerized devices. The processors may use any instruction set architecture, including, for example, reduced instruction set computer (RISC) architecture and/or complex instruction set computer (CISC) architecture. In certain non-limiting implementations, the processors may include x86 Processors from AMD and Intel, Xeon® and Pentium® processors from Intel, as well as any combinations thereof, however in more preferable but non-limiting implementations, the processors are implemented as ARM processors (which utilize RISC architecture). Regardless of the particular implementation of the processor(s) architecture, the CPU 18 is operative to perform the functions of the node 12, including executing the functionalities and operations of the FO calculation module 26, timing module 24, and transceiver 22, as will be detailed herein, including at least some of the processes shown and described in the flow diagram of FIG. 5.

The memory 20 can be, for example, any conventional computer storage media, which can include one or more memory/storage components. In certain embodiments, at least one of the memory/storage components of the memory 20 is preferably configured to store data, for example frequency related information associated with other nodes of the network 10. Preferably, at least one other of the memory storage components of the memory 20 is configured to store machine executable instructions associated with the operation of the components of the node 12, including, for example, the transceiver 22, the timing module 24, the FO calculation module 26, and the clock unit 28, as well as machine readable instructions for executing the processes of FIG. 5, as will be detailed herein.

Each of the timing module 24 and the FO calculation module 26 can be implemented as a hardware module or a software module, and includes software, software routines, code, code segments and the like, embodied, for example, in computer components, modules and the like, that are installed on the node 12. Each of the timing module 24 and the FO calculation module 26 performs actions when instructed by the CPU 18.

The transceiver 22 functions to transmit information bearing signals to one or more other nodes of the network 10, and receive information bearing signals from one or more other nodes of the network 10. In embodiments in which the network 10 is a packet-switched network, the information bearing signals carry data packets, which include groupings of data which are transmitted over the various communication links (channels) of the network.

Although not illustrated, the transceiver 22 (which may also be referred to as a "radio") includes components for signal transmission (i.e., transmitter components) and signal reception (i.e., receiver components). Examples of transmitter components include, but are not limited to, one or more transmit antennas (if the node 12 operates as part of a wireless network, i.e., if the network 10 is a wireless network such as a MANET), one or more local oscillators, one or more frequency upconverters, forward error correction (FEC) encoding circuitry or logic, bit-to-symbol mapping circuitry or logic, one or more signal modulators, one or more frequency filters, and one or more digital-to-analog converters (DACs). Examples of receiver components include, but are not limited to, one or more receive antennas (again, if the node 12 is part of a wireless network), one or more local oscillators, one or more frequency downconverters, one or more bandpass and/or low pass filters, one or more amplifiers (e.g., low-noise amplifiers), one or more channelizers, one or more analog-to-digital converters (ADCs), forward error correction (FEC) decoding circuitry or logic, one or more signal demodulators, symbol-to-bit de-mapping circuitry or logic, one or more correlators, automatic gain control (AGC) circuitry, and frequency shift detector circuitry or logic (which can include phase-locked loops, for example, Costas loops).

The transceiver 22 can also include signal processing circuitry, such as one or more digital signal processors (DSPs) and/or baseband signal processors, for processing signals to be transmitted and/or processing received signals. In certain non-limiting implementations, the transceiver 22 can be implemented as part of a network interface controller that implements the electronic circuitry required to communicate with other network nodes using the specific physical layer and data link layer of the communication protocol/standard supported by the network 10.

The clock unit 28 includes a local oscillator (LO) 30, a raw counter 32, and a time clock 34 (or simply clock 34). The LO 30 defines the local frequency of the node 12, and can be used by the node 12 as a basis to change the frequency of signals transmitted by the node 12. The LO 30 additionally provides timing and timing control information for the node 12, and is typically formed of an electronic oscillator (which produces a periodic oscillating electronic signal) coupled to a frequency mixer. In certain implementations, the LO 30 is implemented as a crystal oscillator that generates an electrical signal of constant frequency that can be used to keep track of time and provide a stable clocking signal for the transceiver 22 and other components of the node 12. The LO 30 can also be used to stabilize the frequency for the transceiver 22. In the frequency synchronization methods according to the embodiments of the present disclosure, the frequency that is output by the clock unit 28 (which is based on the LO 30 frequency and the clock 34) is adjusted according to some determined frequency correction factor (which in certain non-limiting embodiments is performed by adjusting the clock 34) in order to reduce as much as possible, and preferably minimize, and most preferably eliminate, the biases that are implicitly present between local frequency of the node 12 and the local frequency of the other nodes of the network 10 to enable effective communication between the node 12 and the remaining network nodes.

Parenthetically, it is noted that although a particular non-limiting example architecture of network nodes is depicted in FIG. 2 for representative purposes, other node architecture implementations are contemplated herein, and in certain cases may be more practicable than the architecture illustrated in FIG. 2. For example, in certain architectures, the clock unit 28 may be considered as part of the transceiver 22, as the LO 30 may be used by the transmitter components of the transceiver 22 to change the frequency of signals to be transmitted by the transceiver 22 and/or used by the receiver components of the transceiver 22 to change the frequency of signals received by the transceiver 22. In further detail of such practical architecture implementations, a representative network node can include a single board computer (SBC) that includes the CPU 18, the memory 20 and various modules implemented as hardware and/or software and/or firmware (including the timing module 24 and various network logic components). A digital processing unit (DPU), connected to the SBC via a motherboard connection and/or a data bus, includes logic circuitry for implementing the transceiver 22 components. Such transceiver components include physical layer components mentioned above including, for example, baseband processing components, channelizers, correlators, AGC circuitry, FEC encoding/decoding components, modulator/demodulator components, bit-to-symbol mappers and de-mappers, frequency shift detectors, etc. The logic circuitry is preferably implemented as one or more field programmable gate array (FPGA), but can also be implemented as one or more application-specific integrated circuit (ASIC), one or more field programmable logic array (FPLA), and the like. In addition, the DPU includes the clock unit 28 such that the LO 30, the raw counter 32 and the clock 34 reside on the DPU (e.g., on the FPGA, FPLA, ASIC, etc.).

The raw counter 32 is coupled to the LO 30, and functions to count the number of ticks of the LO 30. The raw counter 32 can be implemented digitally using a register, for example an n-bit register, and can be used by the timing module 24 to acquire frequency information from the clock unit 28 such that the FO module 26 can calculate frequency offsets based on acquired frequency information. The clock 34 is also a (tick) counter, and is preferably set as close as possible to time of day (TOD) upon initialization (factory calibration) of the clock unit 28 (which can correct for bias), and advances in frequency based on the LO 30. According to certain embodiments of the present disclosure, frequency correction can be performed by adjusting the ratio between the ticks counted by the raw counter 32 and the ticks counted by the clock 34, as will be discussed in further detail below.

The following paragraphs describe three different techniques for each node to perform frequency shift measurement according to embodiments of the present disclosure. In one embodiment, frequency shift measurement is performed by each of the nodes 12*a*-12*g* using the transceiver 22, and the receiving algorithms performed thereby, as a basis to acquire frequency compensation information and/or frequency information indicative of local frequency of one or more other nodes of the network 10, and using the FO module 26 to determine or calculate a frequency offset (or frequency compensation factor) based on the information acquired using the transceiver 22. In such an embodiment, for each node of the network 10, information extracted from metadata associated with messages that are successfully decoded (at the transceiver 22 of the node) from received signal transmissions (incoming from (i.e., transmitted by) a neighboring node) that pertains to the frequency compensation (i.e., the frequency shift/offset) used for that transmission is transferred to the higher OSI layers. Since the signal reception and decoding is performed at the physical layer (layer 1 or the lowest layer of the OSI model) by the transceiver 22 of the node, the frequency compensation information can be part of metadata associated with the transmission, and the frequency compensation information in the metadata is thereafter transferred from the physical layer up to the data link layer, and possibly further up to the network layer. When the transceiver is implemented as part of a network interface controller that implements both the physical layer and the data link layer in electronic circuitry, the transferring can be achieved simply using one or more interfaces, such as a data bus, that connects between the electronic circuits.

To further illustrate the frequency shift measurement technique according to the present embodiment, the general case of a pair of neighboring nodes (e.g., 12*a* and 12*b*) that attempt to establish communication with each other (i.e., transmit/receive) is considered. The node in the pair of neighboring nodes that transmits is referred to hereinafter as the "transmitting node", and the node in the pair of neighboring nodes that receives from the transmitting node is referred to hereinafter as the "receiving node". In order to establish communication between the transmitting and receiving nodes according to the present embodiment, the initial local frequencies of the neighboring nodes, although different, should be within a maximum frequency separation such that frequency correction of the local frequency of the receiving node relative to the transmitting node is feasible so as to enable the receiving node to receive/decode signals transmitted by the transmitting node.

Parenthetically, the case in which the initial local frequencies are separated by more than the maximum frequency separation can be handled using other approaches or techniques, for example synchronizing the node to a well-known external source such as GPS.

The frequency correction mentioned above is performed at the physical layer by the transceiver of the receiving node using any one of well-known receiver algorithms components (e.g., carrier recovery algorithms, etc.). When the transceiver of the receiving node successfully receives/decodes a transmission from the transmitting node, the frequency compensation information (i.e., the frequency correction applied to the local frequency of the receiving node) that enabled the successful receipt/decoding of that particular transmission is generated as metadata by the transceiver of the receiving node. This metadata, containing the frequency compensation information, is associated with the successfully decoded message, and can be provided to other protocol layers, where the frequency compensation information can later be extracted from the metadata.

The receiving node also stores the frequency compensation information, together with a locally unique identifier that identifies the node from which the decoded signal transmission was received (i.e., the transmitting node). The frequency compensation information and the identifier of the transmitting node can be stored in a memory of the node, for example memory 20. In certain embodiments, the metadata that includes the frequency compensation information may also include a confidence level indicative of the confidence of the frequency of the clock 34 of the transmitting node. This confidence level may also be stored in a memory (e.g., the memory 20) of the node.

The FO module 26 can then determine the frequency offset from the frequency compensation information extracted from the metadata. In the present embodiment, the FO module 26 may simply determine the frequency offset as the frequency compensation information extracted from the metadata. In certain embodiments, the FO module 26 of a receiving node may additionally calculate the local frequency of a transmitting node based on the initial local frequency of the receiving node and the determined frequency offset (extracted from the metadata).

It is noted that the frequency shift measurement (specifically the acquisition of frequency shift information) is performed directly between two neighboring nodes based upon receipt of a signal transmission. Measurement between nodes that are separated by more than one network hop can be performed by distributing amongst the nodes the frequency shift information pertaining to neighboring nodes, and compounding the frequency shifts. By way of one non-limiting illustrative example, node 12*b* may directly receive signal transmissions from neighboring node 12*a* via the communication link 13*ab*. Using the physical layer to upper layer transfer methodology discussed above, the node 12*b* may measure the frequency shift between the local frequency of the node 12*b* and the local frequency of the node 12*a* upon successively receiving and decoding a signal transmission from the node 12*a*. The frequency shift between the local frequency of node 12*b* and the local frequency of node 12*a* can be denoted as $\delta_{12b,12a}$. Using similar methods, the node 12*f* may directly receive signal transmissions from neighboring node 12*b*, and may measure the frequency shift between the local frequency of the node 12*f* and the local frequency of the node 12*b*, denoted as $\delta_{12f,12b}$, based upon successively receiving and decoding a signal transmission from the node 12*b*. The signal transmission from node 12*b* may also include metadata pertaining to the frequency shift between the local frequencies of the nodes 12*b* and 12*a* (i.e., $\delta_{12b,12a}$). Thus, the node 12*f* can determine the frequency offset between the local frequencies of the node 12*f* and the node 12*a* (denoted $\delta_{12f,12a}$) by compounding the neighbor pairwise frequency offsets $\delta_{12f,12b}$ and $\delta_{12b,12a}$. In other words, the node 12*f* can determine the frequency offset between the local frequencies of the node 12*f* and the node 12*a* by using the formulation $\delta_{12f,12a}=\delta_{12b,12a}+\delta_{12f,12b}$.

By extrapolating the above example, and as should become apparent, signal transmissions received at each node can include, for example as part of metadata, frequency offset information pertaining to the node that sent the signal transmissions as well as every other node in the network. Accordingly, the frequency offset information between each node and each other node can be propagated throughout the network across nodes separated by multiple network hops, thereby enabling the nodes to synchronize to a common frequency.

In the above-described physical layer methodology, a pair of neighboring nodes may establish communication with each other if the neighboring nodes operate at initial frequencies that are separated by at most some allowable frequency offset or margin that still enables successful demodulation and decoding of signal transmissions despite differences in local node frequencies. The physical layer methodology advantageously provides a frequency synchronization solution even in situations in which one or more pairs of neighboring nodes have initial local frequencies separated by more than such an allowable frequency offset or margin. For example, if nodes 12*c*, 12*d* and nodes 12*e*, 12*g* have initial local frequencies separated by more than the allowable frequency offset, but all other pairs of nodes have initial local frequencies separated by less than the allowable frequency offset, eventually the local frequency of node 12*c* and/or node 12*d* will be adjusted due to successful communication between: i) node 12*c* and one or more of nodes 12*a*, 12*g*, and/or ii) node 12*d* and one or more of nodes 12*b*, 12*e*, 12*g*. Likewise, eventually the local frequency of node 12*e* and/or node 12*g* will be adjusted due to successful communication between: i) node 12*e* and one or more of nodes 12*d*, 12*f*, and/or ii) node 12*g* and one or more of nodes 12*c*, 12*d*.

Although measuring frequency shifts using the above-described physical layer methodology can provide frequency synchronization for the network 10, the above-described methodology relies on determining frequency offsets between pairs of neighboring nodes predicated upon the successful decoding of messages at the physical layer, which requires that neighboring nodes operate at initial frequencies that are separated by at most some allowable frequency offset or margin that still enables successful demodulation and decoding of signal transmissions despite differences in local node frequencies. This may result in a situation in which the overall frequency synchronization of the network nodes may have a relatively slow convergence time, or situations in which the neighboring nodes have frequency offsets between their local frequencies that do not enable successful demodulation and decoding. In an extreme case, if no pair of neighboring nodes has initial local frequencies separated by less than such an allowable offset or margin, communication in the network cannot be established between any pair of neighboring nodes, and thus information cannot be exchanged/propagated in the network.

Figure 3:
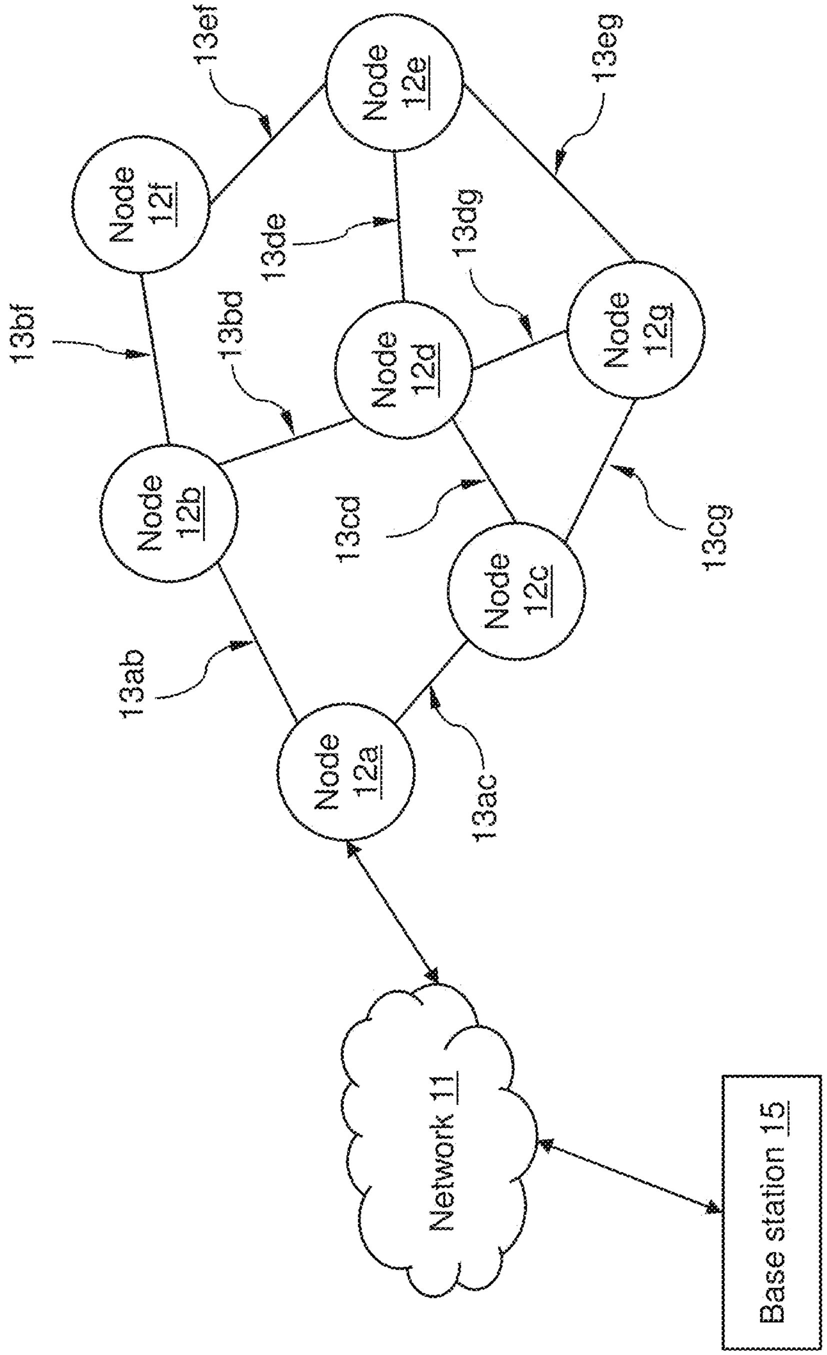
FIG. 3 is a schematic representation similar to FIG. 1, but in which one of the nodes of the decentralized communication network is linked to another communication network that can provide timing information to the nodes of the decentralized communication network.

In order to enable successful frequency synchronization in spite of the situations mentioned above, certain embodiments of the present disclosure are directed to performing frequency shift measurement using the timing module 24 to acquire frequency information from other nodes of the network 10. In such embodiments, each of the nodes 12*a*-12*g* determines its local frequency offset relative to a common time source of the network 10. The common time source is preferably a node of the network 10 that acts as a time source that provides synchronization among the clocks of the nodes of the network 10. In certain non-limiting implementations, the common source node is a physical node of the network 10 which can receive timing information via networked communication with another network (different from the network 10), such as, for example, a cellular network (e.g., 3G, 4G/LTE, 5G network), a global navigation satellite system (GNSS) communication network, or any other network that can providing accurate timing information. FIG. 3 illustrates such an example, in which the node 12*a* is linked to another network 11, which provides timing information, for example via a base station 15 (e.g., cellular base station), thereby enabling the node 12*a* to function/operate as the time source for the network 10.

In other non-limiting implementations, the common source node is a virtual network node, which has an associated virtual clock that is based on the clock 34 of one or more of the nodes of the network 10. For example, the virtual clock can be an average of the clock 34 of all of the nodes 12*a*-12*g* of the network 10.

By way of introduction to embodiments in which frequency shift measurement is performed using the timing module 24 to acquire frequency information from other nodes of the network 10, many decentralized networks employ one or more network time synchronization (NTS) algorithms for clock synchronization amongst the nodes of the network. Examples of well-known NTS algorithms are Precision Time Protocol (PTP) and Network Time Protocol (NTP). In general, each node includes an NTS module (which in the context of the present disclosure can be embodied on the timing module 24 or another module linked to the timing module 24) that actively performs an NTS algorithm for synchronizing the clocks of the network nodes and which ensures that the time skew between the clock of any network node and the clock of the time source node is upper bounded by a value denoted $t_{UB}$. It is noted that in certain implementations, a virtual clock, which can be logically implemented as an offset value, can be used instead of the actual physical clock 34 of the nodes. In certain non-limiting implementations, one of the physical nodes of the network 10 acts as a time source node whose clock acts as a reference clock of the network 10. The reference clock is used to provide timing information to the remaining nodes of the network 10, whereby the output of the reference clock is used together with output of the clocks of the remaining network nodes as input for performing the NTS algorithm in order to synchronize the clocks.

In other implementations, the time source node is not a physical node of the network 10, but is rather a virtual node, in which convergence of clock synchronization is performed by what is commonly referred to as "central mass" techniques, whereby each network node fixes its clock to a weighted average of the clocks of all of its neighboring nodes. In such implementations, for each node, the weighted average of the neighboring node clocks acts as a reference clock for that node.

Bearing the above in mind, in one set of embodiments in which frequency shift measurement is performed using the timing module 24, the timing module 24 of each node sets (determines) a clock tick measurement time frame (denoted Δt). The measurement time frame Δt follows the clock 34, and thus the frequency, of the time source node. The clock 34 of the time source node acts as a reference clock of the network 10.

For each node of the network 10, several factors can be taken into consideration when determining an appropriate value for Δt, including the accuracy of the LO 30 of the node (as well as the LO of the time source node), the frequency shift goal (denoted $\delta f^G$)—which is the desired accuracy of the frequency of the node after applying a frequency correction factor (i.e., after apply the determined frequency offset), as well as parameters of the LO 30 of the node including the aging of the LO and retrace (which as previously mentioned is the frequency bias which the LO incurs upon power up). In general, the measurement time frame Δt should be long enough such that any overall errors $\in_f$ in the measurement (which can be from, for example, errors in the NTS algorithm time skew upper bound $t_{UB}$, physical layer receiver errors (e.g., decoding errors), and the like) will be averaged out. Taking the above factors into account, the following expression can be formulated: $\in_f/\Delta t<\delta f^G$, which implies that $\Delta t>\in_f/\delta f^G$.

After setting Δt, the timing module 24 of the node samples the raw counter 32 at a first time-instance at the beginning of the measurement time frame Δt and a second time-instance at the end of the measurement time frame Δt to obtain a number of clock ticks for the measurement time frame Δt. Specifically, by sampling the raw counter 32 at the two time-instances which bound the time frame Δt, the timing module 24 of the node obtains the tick count at the first time-instance (denoted $c_1$) and the tick count at the second time-instance (denoted $c_2$). The timing module 24 of the node then calculates the actual number of clock ticks which elapsed during the measurement time frame Δt as $\Delta c=c_2-c_1$, and compares the actual number of elapsed clock ticks with the number of clock ticks that were expected to have elapse during the measurement time frame Δt. The expected number of elapsed clock ticks is a function of the base frequency $f_0$ of the LO 30 of the node and the measurement time frame Δt, and can be expressed as the product of the two, i.e., $\Delta tf_0$. Based on the actual number of clock ticks Δc counted as elapsed during the measurement time frame Δt and the expected number of clock ticks $\Delta tf_0$, the FO module 26 (or in certain implementations the timing module 24) of the node determines a clock tick correction factor relative to the reference clock, and based on the clock tick correction factor can calculate/determine the frequency offset δf between the local frequency of the node and the local frequency of the time source node. In particular, the FO module 26 or timing module 24 can compute δf according to the following formulation:

$$\delta f \sim \frac{\Delta c - \Delta t f_0}{\Delta t}.$$

By way of one non-limiting illustrative example, a case is considered in which the node 12*a* acts as the time source of the network 10 (i.e., the clock 34 of the node 12*e* is a reference clock for all other network nodes, and is used by an NTS algorithm to provide timing synchronization for the network 10), and the node 12*e* determines the frequency offset between the local frequency of the node 12*e* and the local frequency of the node 12*a*. For sake of illustration, it is assumed that the LO 30 of the node 12*e* has a base frequency $f_0$ given as 1 MHz, and that the timing module 24 of the node 12*e* sets the measurement time frame to be exactly one hour (i.e., Δt=3600 seconds). The timing module 24 of the node 12*e* samples the raw counter 32 of the node 12*e* at the beginning of the measurement time frame so as to obtain the actual clock tick count ($c_1$) at the beginning of the measurement time frame. When the reference clock (clock 34 of the node 12*e*)—which has already undergone time correction by an NTS algorithm using the node 12*a* as the time source—covers the measurement time frame (in this case exactly one hour), the timing module 24 of the node 12*e* samples the raw counter 32 of the node 12*e* so as to obtain the actual clock tick count ($c_2$) at the end of the measurement time frame. For example, assume that the timing module 24 of the node 12*e* calculates the actual number of clock ticks which elapsed during the measurement time frame to be $\Delta c=c_2-c_1=3599999964$ ticks. The timing module 24 of the node 12*e* also calculates the expected number of elapsed clock ticks to be $\Delta tf_0=3600\cdot 10^6$. Thus, the timing module 24 of the node 12*e* can calculate/determine that the raw counter 32 of the node 12*e* is off by 36 clock ticks ($|\Delta c-\Delta tf_0|$), and is in fact slower than the reference clock (which in the present example is the clock 34 of the node 12*a*) by 36 clock ticks, resulting in a frequency offset $$\delta f=\frac{36}{3600}=-10$$

Millihertz (mHz). The 36 clock ticks should be evenly spread over the measurement time frame, i.e., in the present example evenly spread over one hour, thus the timing module 24 of the node 12*e* counts every second as $$10^6-\frac{36}{3600}=999999.99$$

ticks. Thus, the node 12*e* requires one less tick per second every $$\frac{3600}{36}=100$$

seconds (i.e., a clock tick correction factor of one tick approximately every 100 seconds).

Although the clock tick counting method according to the embodiments described above can provide accurate frequency synchronization among the nodes of the network 10, one drawback of such embodiments is that in order for each node to perform frequency measurement, the timing module 24 of that node is required to access the raw counter 32 of the node. In certain situations (i.e., certain radio architectures), it may be undesirable or even not possible to access the raw counter, and therefore other methods for providing frequency synchronization using the timing module 24 may be preferred.

According to another set of embodiments in which frequency shift measurement is performed using the timing module 24, the FO module 26 (or in certain implementations the timing module 24) of each node calculates the frequency offset between the local frequency of the node and the local frequency of the time source node based on the measurement time frame $\Delta t$ and the amount of cumulative time corrections applied to the clock 34 of the node during the measurement time frame $\Delta t$. Thus, in such embodiments, accessing the raw counter is not necessary in order to provide frequency synchronization.

In the present embodiments, the timing module 24 sets the measurement time frame $\Delta t$ in a manner similar to as described in the previous embodiments in which the timing module 24 samples the raw counter. The timing module 24 tracks and accumulates all time corrections made (by the NTS algorithm, executed, for example, by the timing module 24 or a dedicated NTS module executed by the CPU 18 of the node) during the measurement time frame $\Delta t$. The accumulated time corrections are denoted herein as $\delta t$. Based on the accumulated time corrections $\delta t$ and the measurement time frame $\Delta t$, the FO module 26 of the node can calculate/determine the frequency offset $\delta f$ between the local frequency of the node and the local frequency of the time source node. In particular, the FO module 26 can compute $\delta f$ according to the following formulation:

$$\delta f=f_0\frac{\delta t}{\Delta t},$$

in which $f_0$ is the base frequency that is output by the LO 30 of the node. Once the frequency offset is calculated, the node can transmit a message to the time source node to recommend that the time source node adjust its local frequency by the determined frequency offset amount to synchronize the frequency of the two nodes. alternatively, the node can adjust its local frequency by the determined frequency offset amount to synchronize the frequencies of the two nodes.

By way of one non-limiting illustrative example, consider the same case described above in which the node 12*a* is the time source of the network 10, and the node 12*e* determines the frequency offset between the local frequency of the node 12*e* and the local frequency of the node 12*a*. For sake of illustration, it is assumed that synchronization among the clocks of the network nodes is achieved using an NTS algorithm with a time skew of $t_{UB}=1$ μsec. Thus, each second of frequency drift causes the clock 34 of each node to count somewhere between 0.5 μsec more than an actual second or 0.5 μsec less than an actual second. Also, for sake of illustration, it is assumed that the LO 30 of the node 12*e* has a base frequency $f_0$ given as 1 MHz, and that the timing module 24 of the node 12*e* sets the measurement time frame to be exactly one day (i.e., $\Delta t=86400$ seconds). The timing module 24 of the node 12*e* tracks the time corrections that were made during the clock synchronization process, and accumulates the time corrections made to the clock 34 of the node 12*e* as $\delta t$, which for the sake of illustration in the present example is taken to be $\delta t=+1$ msec. Thus, using the formulation above, the FO module 26 of the node 12*e* calculates/determines that the frequency offset between the local frequency of the node 12*e* and the local frequency of the node 12*a* is $$1\text{ MHz}\frac{.001}{86400}\approx 11.6\text{ mHz}.$$

Node 12*e* can then transmit a message to the node 12*a*, recommending that node 12*a* adjust its local frequency by the frequency offset amount of 11.6 mHz (using the ticks counted by the clock 34 of node 12*a* to adjust the ticks counted by the raw counter 32 of the node 12*a* so as to correct the LO 30 of the node 12*a*). Alternatively, the node 12*e* can adjust its local frequency by the frequency offset amount of 11.6 mHz (using the ticks counted by the clock 34 of node 12*a* to adjust the ticks counted by the raw counter 32 of the node 12*a* so as to correct the LO 30 of the node 12*e*).

In the embodiments described above in which frequency offset is determined based on timing information associated with the time source node (i.e., based on the measurement time frame together with sampling of the raw counter or accumulation of time corrections) that is calculated or obtained by the timing module 24, in certain scenarios each node can measure its frequency offset relative to the time source node and then immediately apply a frequency correction (by the FO module 26 of the node) based on the determined frequency offset to correct the frequency of the node. Alternatively, each node, after measuring its frequency offset relative to the time source node, can send a message to the time source node recommending that the time source (using its FO module 26) apply a frequency correction (based on the frequency offset) to correct the frequency of the time source node.

However, and as previously mentioned, in certain embodiments each node can distribute (disseminate) the determined frequency offset to some or all of the other nodes of the network 10 before applying the frequency correction, thereby obtaining a more robust and complete frequency offset measurement between pairs of network nodes. The frequency offset distribution can be performed by transmitting the frequency offset information as part of one or more signals or data packets using the transceiver 22 or a network controller that is formed in part by the transceiver 22. Prior to distributing the frequency offset information, each node preferably stores each frequency offset and an identifier that identifies the corresponding node with respect to which the frequency offset was determined in a memory of the node (e.g., memory 20). The frequency offset and the identifier are preferably relationally stored, such that accessing a stored frequency offset will also indicate the identifier of the corresponding node. For example, in the numerical time correction accumulation example provided above, the node 12*e* stores the frequency offset of 11.6 mHz and an identifier that identifies the node 12*a* as the node with respect to which the frequency offset of 11.6 mHz was calculated.

Each node can then send the stored frequency offset and identifier information to the various other network nodes, in particular neighboring nodes, such that the frequency offset information will propagate throughout the network 10. It is noted that frequency offset information received at a given node is presented as information relative to the time source, and in certain cases also relative to the sender. When a node receives frequency offset information in a message, the node processes the data in the message to calculate frequency offset between its local frequency and the node or nodes included in the message. For example, the node 12*g* can receive a message from the node 12*e* that contains frequency offset information of 11.6 mHz. However, this information indicates that the node 12*e* has a frequency offset of 11.6 mHz relative to the node 12*a*. If, for example, the node 12*g* performed the time correction accumulation methodology described above to determine that the offset between the local frequency of the node 12*g* and the local frequency of the node 12*a* is 1.6 mHz, the node 12*g* processes the frequency offset information received from the node 12*e* to calculate the offset between the local frequency of the node 12*g* and the local frequency of the node 12*e* as 1.6 mHz−11.6 mHz=−10 mHz.

Each time a message containing frequency offset information is received by a node, the node can update its stored frequency offset information and corresponding node identifier to include the received frequency offset information. In certain embodiments, each message that contains frequency offset information may also include or be accompanied by a control message that is indicative of the expected quality of the frequency offset information. Thus, for each node, the stored frequency offset information can have an assigned weight for each element of the frequency offset information. The quality of the frequency offset information can be determined based on various metrics or measures used alone or in combination, including, for example, signal-to-noise ratio (SNR), time figure of merit (TFOM), distance between nodes, and the like.

FIG. 4 illustrates an example of a relational data table of the type that can be stored and updated at the nodes of the network 10. For sake of illustration, the table shown in FIG. 4 is a table stored and updated at the node 12*e* and transmitted/sent to other nodes in the network 10. The illustrated table shows frequency offset information that was calculated by the node 12*e* to determine the frequency offset $\delta f_{12e,12a}$ between the local frequency of the node 12*e* and the local frequency of the node 12*a*, and the frequency offset $\delta f_{12e,12f}$ between the local frequency of the node 12*e* and the local frequency of the node 12*f*, and the frequency offset $\delta f_{12e,12g}$ between the local frequency of the node 12*e* and the local frequency of the node 12*g*. The frequency offsets $\delta f_{12e,12f}$ and $\delta f_{12e,12g}$ may be calculated by the node 12*e* based on frequency offset information in messages received from the nodes 12*f* and 12*g*. The column "origin node" in FIG. 4 represents the identifier of the node upon which the frequency offset value is based.

In certain embodiments, each node employs its FO module 26 to apply a frequency correction to the local frequency of the node. In many cases, the frequency correction is applied after the frequency offset information of each node is distributed throughout the network 10, however as will be further detailed, information distribution may not be necessary in certain situations.

Generally speaking, two methodologies for applying frequency correction for a node are described herein, each based in part on the frequency offset information of the node. In embodiments according to one of the methodologies, the frequency correction decision made by each node is a source-based decision, meaning that the decision to correct the frequency of a node is made not only based on the frequency offset information of that node, but also on a source node type. For example, if node 12*a* is the time source node, and the node 12*b* determines a frequency offset between the local frequency of the node 12*b* and the local frequency of the node 12*a* (using the raw counter or time correction accumulation methods described above), the network 10 may designate the node 12*a* as a frequency source node (in addition to being the time source node), such that all other nodes of the network 10 measure local frequencies relative to the local frequency of the node 12*a*. Thus, if at any point a frequency source node is designated (defined) in the network 10, and a given node has frequency offset information indicating the frequency offset between the local frequency of the given node and the local frequency of the frequency source node, the given node can correct its local frequency. In situations in which a frequency source node is defined in the network 10, and is the same node as the time source, the distribution of frequency offset information amongst the other nodes of the network 10 is not necessary, since all of the other nodes will adjust local frequencies to the time/frequency source node.

However, the frequency source node may not necessarily be the same node as the time source node. In other words, one node of the network 10 may act as the time source, whereas a different node of the network 10 may act as the frequency source node. For example, a case is considered in which node 12*a* is the time source and the node 12*e* calculates the frequency offset between the local frequencies of the nodes 12*a* and 12*e* (using the raw counter or time correction accumulation methods described above). If the node 12*e* sends the node 12*a* a message recommending that the local frequency of the node 12*a* be corrected to the local frequency of the node 12*e*, and the node 12*a* complies with the recommendation, then the node 12*e* becomes the de facto frequency source of the network 10. As a result, the node 12*a* is the time source, while the node 12*e* is the frequency source.

In situations in which the time source and frequency source are different nodes, it is preferable that the nodes of the network 10 distribute the frequency offset information throughout the network 10 in order to more quickly converge on a synchronized network frequency. However, information distribution can be avoided by the frequency source node sending a message to the time source node recommending that the local frequency of the time source node be corrected/adjusted to the local frequency of the frequency source node. Once the time source node corrects the local frequency in accordance/compliance with the recommendation, the time source node will have the same local frequency as the frequency source node, and the remaining nodes of the network 10 can use the time source node as a frequency source as well.

Parenthetically, the network 10 may be formed from a plurality of nodes where there are heterogeneous sources of frequency amongst the nodes, whereby the various sources of frequency may have different frequency biases associated therewith. These sources of frequency can be different local oscillator types deployed in different types of nodes. For example, some of the nodes may use linear/harmonic-type electronic oscillators based on crystal oscillators (e.g., Quartz crystals), yet other nodes may use RC oscillator circuits, and yet other nodes may use LC oscillator circuits. Further still, other nodes may use nonlinear/relaxation-type oscillators formed from an energy-storing element (e.g., capacitor) and a non-linear switching element (e.g., latch) connected to each other via a negative feedback loop. The heterogeneous sources of frequency may also include, in addition to potentially different local oscillator types, potential connections to external networks, such as GNSS networks (e.g., the network 11 in FIG. 3) which can be GPS networks, and/or the potential connection to atomic clocks of various types (e.g., Caesium (Cs), Rubidium (Rb), etc.) via one or more external network connections and/or one or more direct connections to networked devices having networked connections to one or more atomic clock devices. Accordingly, the designation of a node to act/operate as the frequency source of the network 10 may change over the period of time during which the network 10 is established based on the type and/or the availability of the sources of frequency mentioned above.

In embodiments according to the other one of the methodologies for applying frequency correction, the frequency correction decision made by each node is a decision that relies on averaging the locally stored frequency offset information in each node after the nodes have distributed the frequency offset information throughout the network 10. For each node, certain elements of the locally stored frequency offset information (exemplified in the rows of the table illustrated in FIG. 4) can be averaged by the FO module 26 of the node in order to determine the frequency correction to be applied for the node. In certain non-limiting implementations, the averaging is a simple averaging in which the FO module 26 calculates the arithmetic mean of the frequency offset values (e.g., the arithmetic mean of $\delta f_{12e,12a}$, $\delta f_{12e,12f}$, and $\delta f_{12e,12g}$). However, performing a weighted-averaging using the assigned weights in the frequency offset information can provide a more accurate frequency correction. Therefore, in certain non-limiting implementations the FO module 26 calculates a weighted average using the assigned weights and the frequency offset values. In the non-limiting example illustrated in FIG. 4, the FO module 26 applies a large weight (15) to the frequency offset value $\delta f_{12e,12a}$, and applies a small weight (1) to each of the frequency offset values $\delta f_{12e,12f}$, and $\delta f_{12e,12g}$. It is noted that other statistical methods can be used, including, for example, median-based correction, and averaging after outlier removal.

Figure 5:
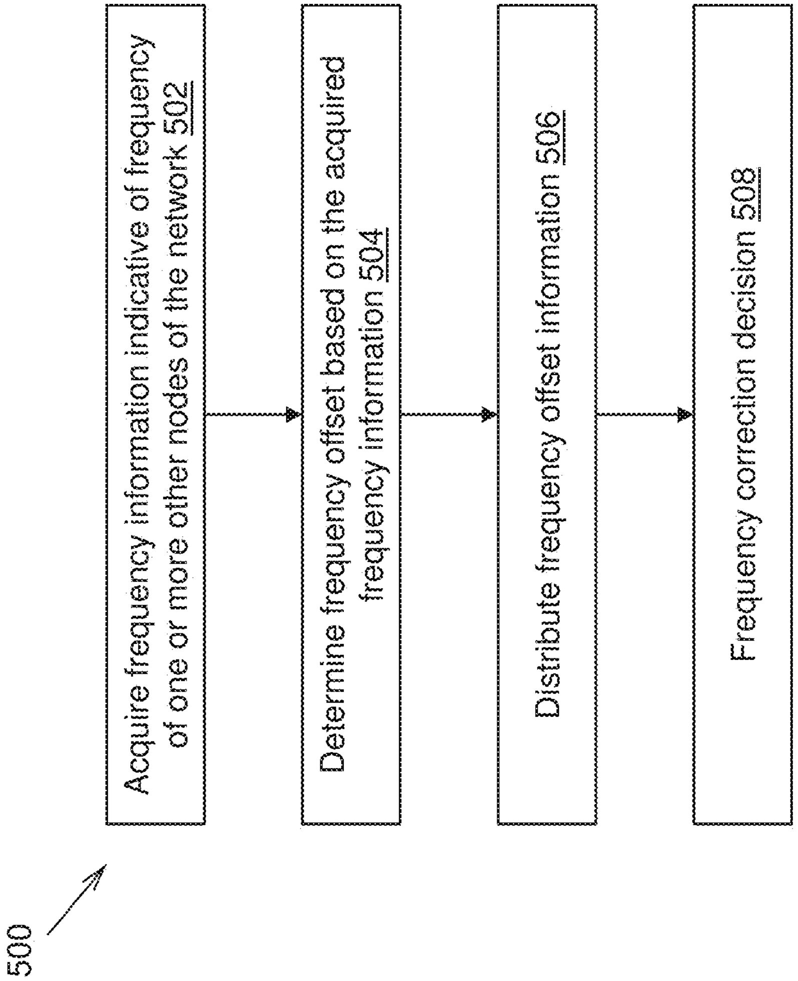
FIG. 5 is a flow diagram illustrating a process for synchronizing frequency among the nodes of the decentralized communication network of FIG. 1.

Attention is now directed to FIG. 5, which shows a flow diagram detailing a process 500 in accordance with embodiments of the disclosed subject matter. The process includes an algorithm for synchronizing frequency amongst the nodes of a decentralized communication network, such as the network 10. Reference is also made to the elements of FIGS. 1-4. The process and sub-processes of FIG. 5 include computerized (i.e., computer-implemented) processes performed by the various nodes of the network, including, for each node of a plurality of the nodes (and in certain cases each and every one of the nodes), the CPU 18 and associated components, including the acquisition module 14, the FO calculation module 26, and the clock unit 28. The aforementioned process and sub-processes are for example, performed automatically, and are performed, for example, in real time.

The process 500 begins at step 502, where the acquisition module 14 of one or more nodes of the decentralized network acquires frequency information indicative of the local frequency of one or more other nodes of the network 10. As discussed above, in certain embodiments, for each of the nodes, the acquisition module 14 of the node employs the transceiver 22 to acquire frequency information indicative of the local frequency of nodes that neighbor the node (i.e., nodes separated by one network hop). As discussed in detail above, in such embodiments the transceiver 22 acquires the information based on successful decoding of received messages at the physical layer. In other embodiments, for each of the nodes, the acquisition module 14 of the node employs the timing module 24 to measure and obtain timing information associated with a time source node, which can be performed via raw counter sampling or time correction accumulation.

At step 504, the FO module 26 of each node determines a frequency offset (frequency correction or frequency compensation) based on the frequency information acquired at step 502. In embodiments which utilize the physical layer approach to acquire frequency information, the FO module 26 determines the frequency offset between the local frequency of the node and the local frequency of a neighboring node (extracted from metadata associated with or contained in messages at the physical layer) by obtaining the frequency compensation information extracted from the metadata. A given node may also calculate the frequency offset between the local frequency of the node and the local frequency of a node that neighbors the neighboring node by compounding the frequency offset between the node and the neighboring node and the frequency offset between the neighboring node and the node that neighbors the neighboring node. In embodiments which acquire frequency information by utilizing the timing module 24 to measure and obtain timing information associated with a time source node, the FO module 26 determines the frequency offset between a given node and the time source node based on raw counter information and a measurement time frame that follows the clock of the time source node, or based on the computed accumulation of time corrections performed during a measurement time frame that follows the clock of the time source node.

Optionally at step 506, each node distributes the frequency offset information (determined at step 504) to the other nodes of the network. The decision of whether or not to distribute the frequency offset information may be based in part on the method used to acquire the frequency information at step 502, and/or the existence or designation of a frequency source node for the network, and/or whether or not an existing designated frequency source node for the network and an existing designated time source node for the network are the same node. For example, and as discussed above, frequency offset information distribution is performed at step 506 in embodiments which utilize the physical layer approach to acquire frequency information.

At step 508, the FO module 26 for each of one or more of the nodes applies a frequency correction decision to the local frequency of the node. In certain embodiments, the correction decision of a node may include sending a recommendation to a second node that the second node should change its local frequency to the frequency of the node. In certain embodiments, the correction decision includes applying a frequency correction, which as discussed above may be based on various factors, including whether or not an existing frequency source node is defined for the network, whether or not a defined frequency source node and a defined time source node are the same node. In other embodiments, the FO module 26 of each node applies a frequency correction based on frequency offset information stored locally at the node, including performing a statistical-based decision, such as simple averaging or weighted averaging of the determined frequency offsets between the node and one or more of the other nodes of the network. As mentioned, other statistical-based decisions are also contemplated herein, including, for example, median-based correction, and averaging after outlier removal.

In embodiments in which acquisition module 14 employs the timing module 24 to acquire frequency information, the functions of FO module 26 may alternatively be performed by the timing module 24.

It is noted that not all of the nodes of a decentralized communication network need use the same methodologies for determining frequency offsets. For example, one or more nodes can use the physical layer approach described above to acquire frequency information, and one or more other nodes can use the raw counter sampling methods described above, and yet one or more other nodes can use the time correction accumulation methods described above. This enables the nodes of a network to flexibly adapt the methods used for determining frequency offsets (and applying frequency correction) according to changing network conditions, thereby providing fast frequency synchronization convergence across the network.

Implementation of the systems and/or methods of embodiments of the disclosure can involve performing or completing selected tasks implemented by hardware, by software or by firmware or by a combination thereof. For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In certain embodiments of the disclosure, one or more tasks according to exemplary embodiments of systems and/or methods as described herein are performed by a computerized data processor that can execute a plurality of instructions. Optionally, the data processor includes a volatile memory for storing instructions and/or data and/or a non-volatile storage, for example, non-transitory storage media such as a magnetic hard-disk and/or removable media, for storing instructions and/or data.

For example, any combination of one or more non-transitory computer readable (storage) medium(s) may be utilized in accordance with the above-listed embodiments of the present disclosure. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of machine-implemented methods are provided herein, some of which can be performed by various embodiments of systems described herein and some of which can be performed according to instructions stored in non-transitory computer-readable storage media described herein. Still, some embodiments of machine-implemented methods provided herein can be performed by other systems and can be performed according to instructions stored in computer-readable storage media other than that described herein, as will become apparent to those having skill in the art with reference to the embodiments described herein. Any reference to systems and computer-readable storage media with respect to machine-implemented methods is provided for explanatory purposes, and is not intended to limit any of such systems and any of such non-transitory computer-readable storage media with regard to embodiments of computer-implemented methods described above. Likewise, any reference to machine-implemented methods with respect to systems and computer-readable storage media is provided for explanatory purposes, and is not intended to limit any of such computer-implemented methods disclosed herein.

The block diagrams and flowcharts in the drawings illustrate the architecture, functionality, and operation of possible implementations of systems and/or methods according to various embodiments of the present disclosure. In this regard, each block in the block diagrams or flowcharts may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for frequency synchronization, the method comprising:

at each of one or more nodes of a plurality of nodes that form a wireless decentralized communication network, acquiring information indicative of a frequency associated with at least one other node of the plurality of nodes, wherein for each of the one or more nodes the acquiring includes:

receiving and decoding at least one signal transmission from a neighboring node, the at least one signal transmission associated with metadata that includes frequency compensation information between a local frequency of the node and a local frequency of the neighboring node, and setting a measurement time frame that follows a reference clock of a time source that provides timing synchronization for the wireless decentralized communication network; and determining, for each of the one or more nodes, a frequency offset between a frequency of the node and a frequency of the at least one other node based at least in part on the acquired information.

2. The method of claim 1, wherein the at least one signal transmission includes metadata indicative of frequency compensation information between a local frequency of the neighboring node and a local frequency of another node that neighbors the neighboring node.

3. The method of claim 1, wherein for each of the one or more nodes the acquiring further includes:

sampling a raw counter of a clock of the node at the beginning of the measurement time frame and at the end of the measurement time frame to obtain a number of clock ticks for the measurement time frame.

4. The method of claim 3, wherein for each of the one or more nodes the determining the frequency offset includes:

comparing the number of clock ticks to an expected number of clock ticks to determine a clock tick correction factor relative to the reference clock, and calculating the frequency offset based on a local oscillator frequency of the node and the determined clock tick correction factor.

5. The method of claim 1, wherein for each of the one or more nodes the acquiring further includes:

calculating an accumulated amount of time corrections made relative to the reference clock during the measurement time frame.

6. The method of claim 5, wherein for each of the one or more nodes the determining the frequency offset includes:

calculating the frequency offset based on a local oscillator frequency of the node and the accumulated amount of time corrections.

7. The method of claim 1, wherein the reference clock is deployed in one of the nodes of the wireless decentralized communication network.

8. The method of claim 1, further comprising:

for each of the one or more nodes, distributing the determined frequency offset to the other nodes of the decentralized communication network.

9. The method of claim 1, further comprising:

for each of the one or more nodes, based on the determined frequency offset applying a frequency correction to the frequency of the node or to the frequency of the at least one other node.

10. The method of claim 1, wherein the at least one other node is the same for each of the one or more nodes and is a node that acts as a time source for the nodes of the wireless decentralized communication network that provides timing synchronization for the wireless decentralized communication network.

11. The method of claim 10, wherein the node that acts as the time source is a virtual node.

12. The method of claim 10, wherein the node that acts as the time source is a physical node of the wireless decentralized communication network.

13. The method of claim 10, wherein the node that acts as the time source is in networked communication with a second communication network that provides timing information.

14. The method of claim 1, wherein the wireless decentralized network is a mobile ad hoc network or a wireless ad hoc network.

15. A wireless decentralized communication network comprising a plurality of nodes, wherein for each node of one or more nodes of the plurality of nodes the node is configured to:

acquire information indicative of a frequency associated with at least one other node of the plurality of nodes by:

receiving and decoding at least one signal transmission from a neighboring node, the at least one signal transmission associated with metadata that includes frequency compensation information between a local frequency of the node and a local frequency of the neighboring node, and setting a measurement time frame that follows a reference clock of a time source that provides timing synchronization for the wireless decentralized communication network, and determine a frequency offset between a frequency of the node and a frequency of the at least one other node based at least in part on the acquired information.

16. The wireless decentralized communication network of claim 15, wherein for each node of the one or more nodes, the node is configured to acquire information indicative of a frequency of at least one other node of the plurality of nodes by: sampling a raw counter of a clock of the node at the beginning of the measurement time frame and at the end of the measurement time frame to obtain a number of clock ticks for the measurement time frame.

17. The wireless decentralized communication network of claim 16, wherein for each node of the one or more nodes, the node is configured to determine the frequency offset by: comparing the number of clock ticks to an expected number of clock ticks to determine a clock tick correction factor relative to the reference clock, and calculating the frequency offset based on a local oscillator frequency of the node and the determined clock tick correction factor.

18. The wireless decentralized communication network of claim 15, wherein for each node of the one or more nodes, the node is configured to acquire information indicative of a frequency of at least one other node of the plurality of nodes by: calculating an accumulated amount of time corrections made relative to the reference clock during the measurement time frame.

19. The wireless decentralized communication network of claim 18, wherein for each node of the one or more nodes, the node is configured to determine the frequency offset by: calculating the frequency offset based on a local oscillator frequency of the node and the accumulated amount of time corrections.

20. A device deployed at a node that is one of a plurality of nodes that form a wireless decentralized communication network, the device comprising:

an acquisition module configured to acquire information indicative of a frequency associated with at least one other node of the plurality of nodes of the decentralized communication network, wherein the acquisition module includes:

a transceiver configured to receive and decode at least one signal transmission from a neighboring node of the decentralized communication network, the at least one signal transmission associated with metadata that includes frequency compensation information between a local frequency of the node and a local frequency of the neighboring node, and a timing module configured to set a measurement time frame that follows a reference clock of a time source that provides timing synchronization for the wireless decentralized communication network; and a frequency offset module configured to determine a frequency offset between a frequency of the node and a frequency of the at least one other node based at least in part on the acquired information.

* * * * *